(No Model.) 2 Sheets—Sheet 1.

F. BATTER.
TRACTION ENGINE.

No. 382,857. Patented May 15, 1888.

Witnesses,
Geo. H. Strong

Inventor,
F. Batter,
By Dewey & Co.
att'ys (No Model.) 2 Sheets—Sheet 2.

F. BATTER.
TRACTION ENGINE.

No. 382,857. Patented May 15, 1888.

Witnesses
Geo. H. Strong
[signature]

Inventor
F. Batter
By Dewey & Co.
atty.

UNITED STATES PATENT OFFICE.

FRANK BATTER, OF SLIDE, CALIFORNIA.

TRACTION-ENGINE.

SPECIFICATION forming part of Letters Patent No. 382,857, dated May 15, 1888.

Application filed February 11, 1888. Serial No. 263,731. (No model.)

*To all whom it may concern:*

Be it known that I, FRANK BATTER, of Slide, Humboldt county, State of California, have invented an Improvement in a Traction-Engine; and I hereby declare the following to be a full, clear, and exact description of the same.

My invention relates to an improved traction-engine for traveling upon soft or yielding ground where wheels cannot be employed.

It consists of endless belts composed of shoes arranged transversely and coupled together to form the belts, a frame-work upon which is mounted an engine, and rollers upon which the engine-frame is supported, and, in combination with this, of an intermediate endless chain of links, which rest upon the outer shoes, while the rollers travel upon these intermediate links, as will be more fully explained by reference to the accompanying drawings, in which—

Figure 1:
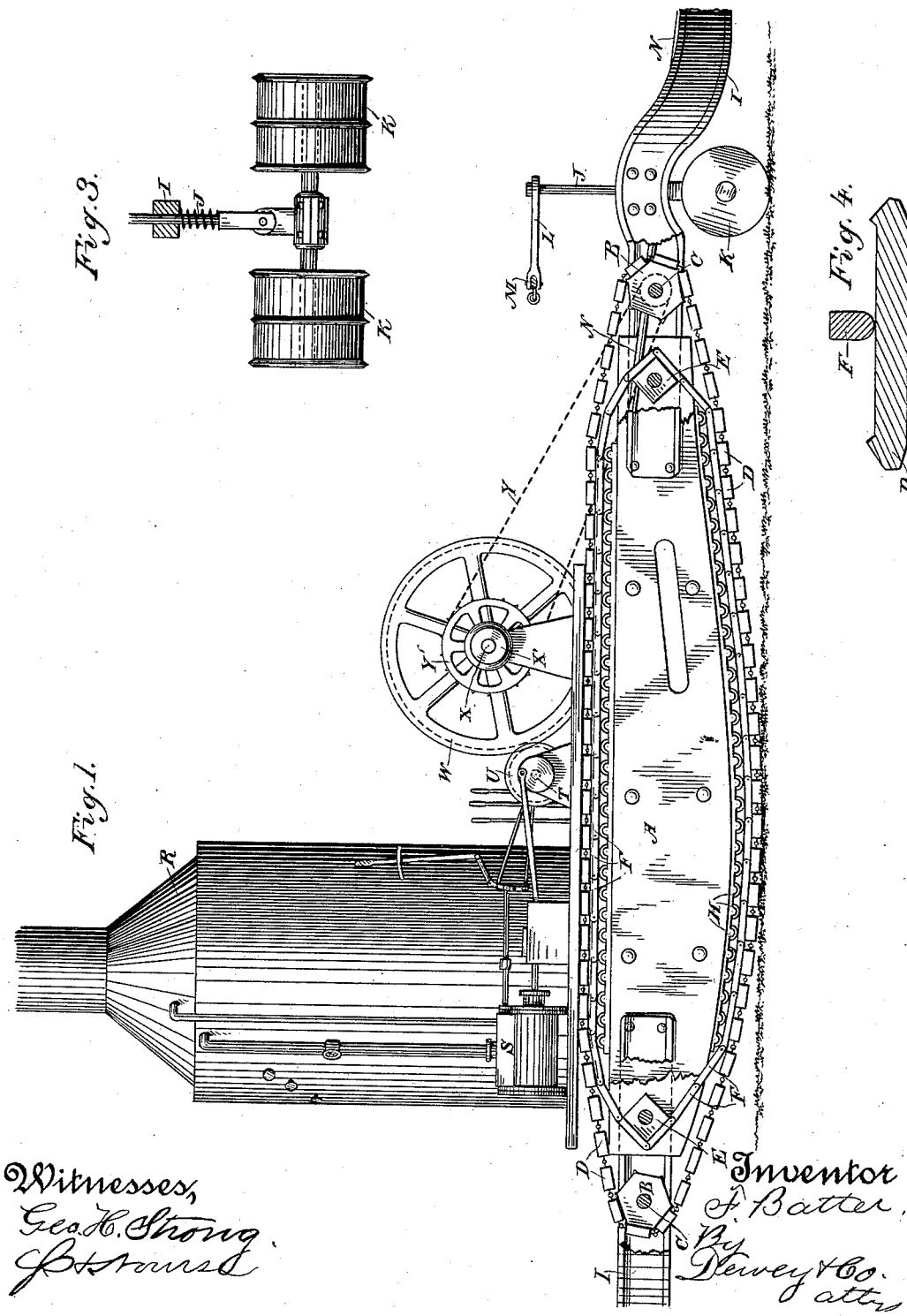
Figure 2:
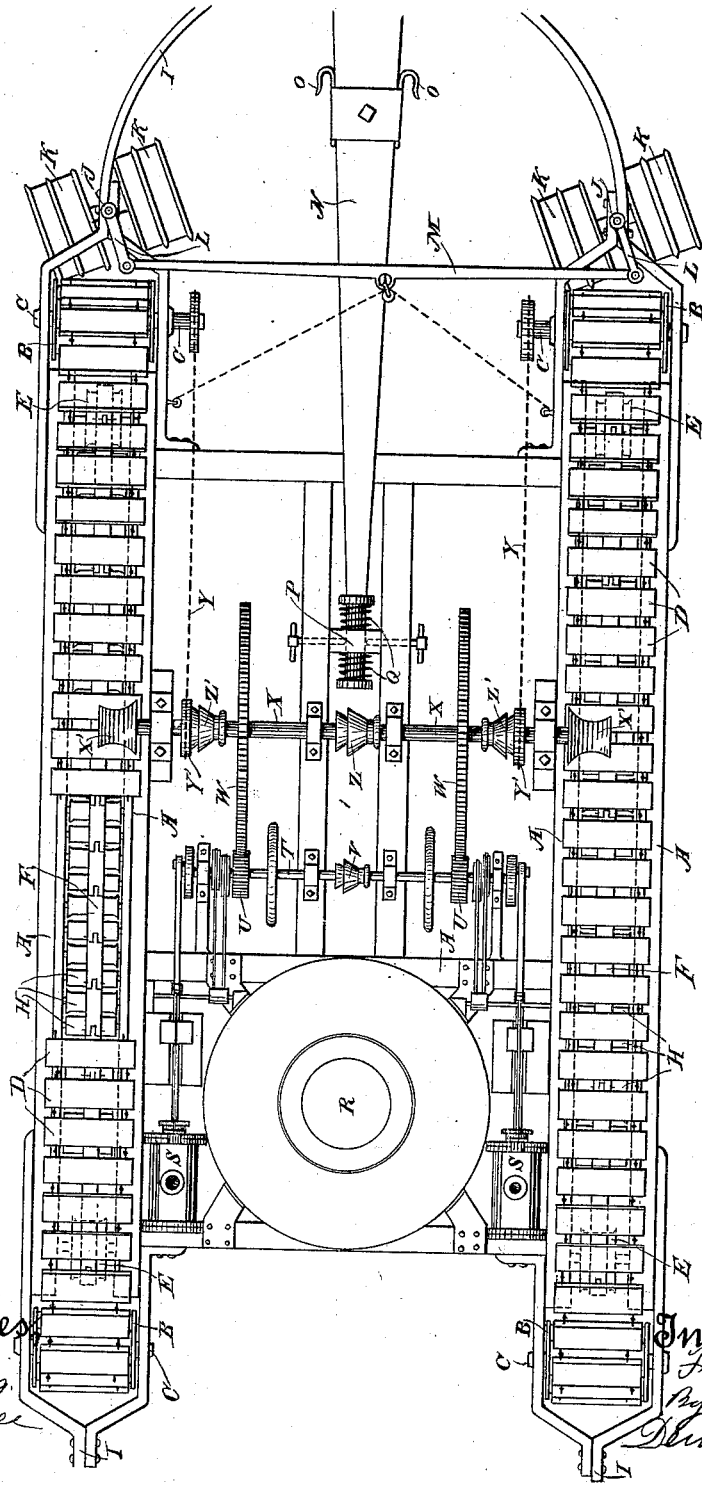

Figure 1 is an elevation of my engine. Fig. 2 is a plan of the same. Fig. 3 is a detail view of my steering device. Fig. 4 is a vertical section through chains D and F, showing also their relative positions.

A A is the frame-work, upon which the engine and the operating mechanism, fuel, and water are supported, also the necessary blocks and tackle to be used with the machine. The lower edges of the said timbers or frames are made curved or convex, and polygonal drums B are journaled upon the ends of each side of the timbers, so as to turn upon independent shafts C. Around these rollers an endless belt travels, which is made of shoes or blocks of wood D, which have a considerable length transversely in order to provide a sufficient bearing for the machine on soft or yielding ground. These blocks are linked or connected together by any suitable form of links or joint which will form an endless chain and will allow them to turn freely about the polygonal rollers above described. A chain of this description passes around the rollers on each side of the machine, and they are independent of each other. At points nearer the center of the machine than the polygonal rollers just described are other sets of rollers, E, around which pass endless chains made of links, as shown at F. These links are united together by pins, so that the links will rest upon the middle portion of the blocks D, which compose the shoes on the outer chain.

Beneath the frame-timbers of the machine are anti-friction rollers H, which are journaled closely together, and these rollers, which are alternately flanged and plain, as shown, travel upon the upper edges of the links of the interior chain. By making alternate rollers with flanges they are kept in place upon the links, and by making the intermediate rollers plain they will travel closer together than if all were flanged. The object of this construction is to allow the outer blocks, which form the shoes D, and which are of considerable length transversely, to adjust themselves to irregularities in the surface of the ground, so that they may conform to the surface, while at the same time the narrow links F, resting upon their central portion, serve to support the rollers, which thus travel upon their upper edges and are not disturbed by the movements of the irregular position of the shoes D.

The frames A A, which form the two sides of the machine and around which the independent endless chains previously described pass, have their front and rear ends united by the curved segments I, made of channel or I iron, these segments being sufficiently strong to practically unite the whole into a rigid frame-work. The steering-shafts J extend vertically upward through guides upon the rear segment and at points behind the traveling endless chains, these shafts having at their lower ends journal-boxes within which the transverse shafts of the steering-drums K are supported. These supporting-boxes are hinged to the vertical shafts J in a plane with the axis of the steering-drums, so as to allow them to conform to irregularities of the surface without interfering with the vertical shafts. The periphery of these drums is preferably flanged, so as to give them a hold on the ground and prevent their slipping sidewise. The upper ends of the shafts J have tillers L secured to them, and these tillers are united by the bar M, to which ropes or tackle are attached, so that sufficient power may be applied to turn the steering-rollers when it is desired to turn the machine to one side or the other. The device to which the logs and timbers are attached to be hauled consist of a long tapering wooden or iron beam, N, having hooks O, upon each side of which the chains from the logs may be attached. The forward and narrower end of this beam is connected with the transversely-adjustable shaft P, and has springs Q, which relieve the strain upon it when logs are being hauled. If it is desired to turn the machine to one side or the other, this beam may be shifted along the shaft P by screws, so that the draft is more to the side toward which it is desired to turn the machine.

R is the boiler, and S S are the engines, which are coupled to the shaft T, carrying the pinions U, so as to rotate said shaft. This shaft is made in two parts, having a clutch coupling at V, by which the two are united, so as to drive together; or one part of the shaft may be driven independently of the other, so that the power of both engines or of a single engine may be applied at will.

W are gear-wheels, with which the pinions U engage to drive them. These gear-wheels are fixed to the two-part shaft X, turning in suitable boxes upon the frame-work, by means of chains Y, passing around chain-wheels Y' upon the shaft X, and similar chain-wheels upon the shafts of the drums B, so as to propel the shoes D which form the endless belt. The shaft X has a clutch at Z, by which either one or the other of the chain belts Y are driven independently of each other, if desired, or both together.

When driven together, the whole power of the engines is applied to drive the machine in a straight line forward; but when it is desired to turn the machine to one side or the other the clutch upon the side toward which it is desired to turn is disengaged, while the other remains in operation. The consequence of this will be to drive the set of shoes upon one side while the others remain stationary, thus turning the machine toward one side.

Z' Z' are conical friction-clutches of well-known form, which, when engaged, serve to connect the chain-wheels Y' with the shaft X, so as to drive the endless belts; but when disengaged they allow the shaft to be driven without advancing the machine. The shaft X has windlass-rollers X' upon the ends, around which ropes or chains are wound to haul logs into position while the engines remain stationary, the clutches allowing this to be done without the use of other independent machinery.

Having thus described my invention, what I claim as new, and desire to secure by Letters Patent, is—

1. The traction-engine consisting of parallel frames united together and having two independent endless belts formed of blocks or sections hinged together, pulleys or drums in the ends of the frames, around which the belts pass and through which they are propelled, in combination with a series of alternately flanged and plain rollers journaled to the lower part of the engine-frame, and an intermediate endless belt composed of links resting upon the central portions of the shoes and upon the upper edges of which the rollers travel, substantially as and for the purpose herein described.

2. The traction-engine composed of parallel frames with the semicircular channel-iron end pieces by which they are united, the endless belts composed of blocks hinged together, having their greatest length transversely to the machine, so as to form shoes upon which the latter is supported, a second belt composed of narrower links united together and resting upon the upper surfaces of the shoes, alternately flanged and plain rollers journaled in the power part of the frames and traveling upon the upper edges of the intermediate links and out of contact with the shoes, in combination with the two sets of steering-drums mounted in pairs on horizontal shafts, vertical shafts, tillers, and connecting rod or bar by which they are turned simultaneously, a divided driving-shaft and clutch couplings by which either one or both traveling belts may be driven, and engines and intermediate gearing by which power may be applied to the same, substantially as herein described.

3. The steering-drums mounted in pairs on horizontal shafts which pass through journal-boxes, said boxes being hinged to vertical steering-shafts, whereby the tread of the drums may conform to the irregularities of the surface without strain upon the vertical shafts, substantially as herein described.

4. In a traction-engine, the parallel frames united together, having the supporting-shoes, the intermediate link belt and the rollers traveling upon the same, together with the engines and driving-shaft, in combination with the draft-bar extending rearwardly from a transverse shaft to which it is attached, and the intermediate springs, Q, substantially as herein described.

5. The traction-engine having the independent endless traveling belts forming shoes upon which it is carried, and engines and driving mechanism, as described, in combination with the draft-bar N, the transverse shaft P, to which said draft-bar is connected, and the screw or mechanism by which the bar may be shifted to one side or the other of the center when it is desired to turn the machine around, substantially as herein described.

In witness whereof I have hereunto set my hand.

FRANK BATTER.

Witnesses:
S. H. NOURSE,
WM. F. BOOTH.